(12) United States Patent
Vontorcik, Jr. et al.

(10) Patent No.: US 10,973,281 B2
(45) Date of Patent: Apr. 13, 2021

(54) INTEGRATED POLYURETHANE ARTICLE

(71) Applicant: Lubrizol Advanced Materials, Inc., Cleveland, OH (US)

(72) Inventors: Joseph J. Vontorcik, Jr., Broadview Hts., OH (US); An Plessers, Mol (BE); Kenneth H. Kim, Hudson, OH (US); Julius Farkas, North Ridgeville, OH (US); Ungyeong Jung, Seven Hills, OH (US)

(73) Assignee: Lubrizol Advanced Materials, Inc., Cleveland, OH (US)

( * ) Notice: Subject to any disclaimer, the term of this patent is extended or adjusted under 35 U.S.C. 154(b) by 0 days.

(21) Appl. No.: 16/673,094

(22) Filed: Nov. 4, 2019

(65) Prior Publication Data

US 2020/0060384 A1 Feb. 27, 2020

Related U.S. Application Data

(62) Division of application No. 15/318,776, filed as application No. PCT/US2015/036552 on Jun. 19, 2015, now abandoned.

(60) Provisional application No. 62/016,202, filed on Jun. 24, 2014.

(51) Int. Cl.
| | |
|---|---|
| *A43B 13/18* | (2006.01) |
| *B32B 5/18* | (2006.01) |
| *B32B 27/40* | (2006.01) |
| *B32B 27/06* | (2006.01) |
| *C08G 18/66* | (2006.01) |
| *A43B 13/04* | (2006.01) |
| *A43B 13/12* | (2006.01) |
| *A43B 13/14* | (2006.01) |
| *C08G 18/76* | (2006.01) |
| *C08G 101/00* | (2006.01) |

(52) U.S. Cl.
CPC ............ *A43B 13/188* (2013.01); *A43B 13/04* (2013.01); *A43B 13/122* (2013.01); *A43B 13/125* (2013.01); *A43B 13/141* (2013.01); *A43B 13/186* (2013.01); *B32B 5/18* (2013.01); *B32B 27/065* (2013.01); *B32B 27/40* (2013.01); *C08G 18/664* (2013.01); *C08G 18/76* (2013.01); *C08G 2101/0008* (2013.01); *C08G 2410/00* (2013.01)

(58) Field of Classification Search
CPC ..... A43B 13/188; A43B 13/04; A43B 13/122; A43B 13/125; A43B 13/141; A43B 13/186; B32B 27/065; B32B 27/40; B32B 5/18; C08G 18/76; C08G 18/664; C08G 2101/0008; C08G 2410/00
See application file for complete search history.

(56) References Cited

U.S. PATENT DOCUMENTS

| | | | |
|---|---|---|---|
| 6,749,781 B1 | 6/2004 | Maurer | |
| 2006/0046622 A1 | 3/2006 | Prasad | |
| 2009/0100723 A1 | 4/2009 | Farkas et al. | |
| 2010/0152405 A1 | 6/2010 | Sunkara | |
| 2013/0125416 A1 | 5/2013 | Hoffer et al. | |

FOREIGN PATENT DOCUMENTS

| | | |
|---|---|---|
| EP | 0771829 A1 | 5/1997 |
| EP | 1847193 A1 | 10/2007 |
| WO | 2012065926 A1 | 5/2012 |

OTHER PUBLICATIONS

Li, K W et al., "The effect of shoe sole thread groove depth on the friction coefficient with different tread groove widths, floors and contaminants", Applied Ergonomics, Butterworth Scientific Ltd, Jan. 19, 2006, pp. 743-748, Guildford, GB.

*Primary Examiner* — Hai Vo
(74) *Attorney, Agent, or Firm* — Eryn Ace Fuhrer; Teresan W. Gilbert

(57) ABSTRACT

This technology relates to an integrated article that includes (a) a flexible foam region and (b) a non-foam region. The flexible foam region and the non-foam region are each made of a polyurethane composition. In some embodiments, the flexible foam region is a midsole, and wherein the non-foam region is an outsole. The flexible foam region is made from a flexible polyurethane injection molded foam. The non-foam region is made from a non-foamed polyurethane, which may be extruded or thermoformed. The invention relates to this integrated article, as well as the methods of making and using the same.

10 Claims, No Drawings

INTEGRATED POLYURETHANE ARTICLE

CROSS REFERENCE TO RELATED APPLICATION

This application is a Divisional of application Ser. No. 15/318,776 filed on Dec. 14, 2016, which claimed priority from PCT Application Serial No. PCT/US2015/036552 filed on Jun. 19, 2015, which claimed the benefit of U.S. Provisional Application No. 62/016,202 filed on Jun. 24, 2014, the entirety of all of which is hereby incorporated by reference.

This technology relates to an integrated article that includes (a) a flexible foam region and (b) a non-foam region. The flexible foam region and the non-foam region are each made of a polyurethane composition. In some embodiments, the flexible foam region is a midsole, and wherein the non-foam region is an outsole. The flexible foam region is made from a flexible polyurethane which is an injection molded or extruded foam. The non-foam region is made from a non-foamed polyurethane, which may be extruded or thermoformed. The invention relates to this integrated article, as well as the methods of making and using the same.

BACKGROUND

This technology relates to an integrated article that includes (a) a flexible foam region and (b) a non-foam region, for example where the flexible foam region is a shoe midsole, and the non-foam region is a shoe outsole.

There are various applications where it is useful to have a foam layer and/or region but where a non-foam layer and/or region is also needed. In these situations, a foam layer and/or region is often combined with a non-foam layer and/or region to form an article that has both. However, it can be difficult to combine these materials to form an integrated article that can stand up to the demands of the end use application, or to do it in a cost effective way.

For example, traditional shoe sole constructions and the materials used to make them have not changed significantly for a long time. Shoe manufacturers have designed shoe soles with two main components: a midsole for cushioning and an outsole for gripping and abrasion resistance. Typical choices of materials are thermoset rubbers and cross-linked thermoplastics, which demand labor-intensive high-scrap-rate multiple-step production processes in order to construct and combine the midsole and outsole.

There is a need for an improved means of constructing and combining a flexible foam layer and/or region and a non-foam layer and/or region, especially where the flexible foam region is a midsole, and the non-foam region is an outsole.

SUMMARY

The disclosed technology provides an integrated article that includes (a) a flexible foam region and (b) a non-foam region. The flexible foam region and the non-foam region comprise a polyurethane composition and in some embodiments the same polyurethane composition. In some embodiments, there is an adhesive between the flexible foam region and the non-foam region, while in other embodiments there is no adhesive and the flexible foam region and the non-foam region are integrated by the manufacturing process alone. In some embodiments, the flexible foam region is a midsole, and the non-foam region is an outsole. As used herein the term region may mean a layer, a surface, a section, or a part of an article. The articles described herein have at least two regions, and in some embodiments only two regions, where one is a flexible foam region and one is the non-foam region.

The disclosed technology provides an integrated article, which may in some embodiments be described as an integrated outsole midsole, that includes (a) a flexible foam midsole; and (b) a non-foam outsole. The midsole and the outsole are each made of a polyurethane composition, and in some embodiments the same polyurethane composition. In some embodiments, there is an adhesive between the midsole and the outsole, while on other embodiments there is no adhesive and the midsole and the outsole are integrated by the manufacturing process alone.

The disclosed technology provides for the described integrated article where the polyurethane composition used for both the flexible foam region and the non-foam region includes the reaction product of: (i) at least one polyol, (ii) at least one isocyanate, and (iii) at least one chain extender. The polyurethane composition can be injection foam molded to form the flexible foam flexible foam region. The polyurethane composition can be (non-foam) injection molded to form the non-foam region. In some embodiments, one polyurethane composition is used for the flexible foam region and a different polyurethane composition is used for the non-foam region.

The disclosed technology provides for the described integrated article where the foamed polyurethane composition of the flexible foam region has a weight average molecular weight of 120,000 to 500,000, and a polydispersity (Mw/Mn) of 1.85 to 2.51; and the non-foamed polyurethane composition of the non-foam region has a weight average molecular weight of 200,000 to 350,000, and a polydispersity (Mw/Mn) of 2.30 to 2.50, or in other embodiments a weight average molecular weight of 200,000 to 230,000, and a polydispersity (Mw/Mn) of 2.30 to 2.33.

The disclosed technology provides for the described integrated article where the foamed polyurethane composition of said flexible foam region has: (i) a vertical rebound, as measured by ASTM D2632, of at least 35%; (ii) a compression set at room temperature, as measured by ASTM D395, of no more than 8%; (iii) a compression set at 50° C., as measured by ASTM D395, of no more than 45%; and (iv) an Asker C hardness, as measured by ASTM D2240, of 35 to 60 or even 46 to 60.

The disclosed technology provides for the described integrated article where the non-foamed polyurethane composition of said non-foam region has: (i) a volume loss at room temperature, as measured by the DIN abrasion test, of less than 100 $mm^3$; (ii) a volume loss at 65° C., as measured by the DIN abrasion test, of less than 100 $mm^3$; (iii) a dry coefficient of friction, as measured by the Plint COF test, of at least 0.5; and (iv) a wet coefficient of friction, as measured by the Plint COF test, of at least 0.5.

The disclosed technology provides for the described integrated article where the foamed polyurethane composition of said flexible foam region and the non-foamed polyurethane composition of said non-foam region both have: (i) a hard segment content of from 23.5 to 45.0 percent by weight, and the polyol component comprises a polyether polyol; (ii) a hard segment content of from 24 to 30 percent by weight, and the polyol component comprises a polyester polyol; or (iii) a hard segment content of greater than 30 percent by weight, and the polyol component comprises a polycaprolactone polyol.

The disclosed technology provides for the described integrated article where the chain extender includes benzene glycol, 1,4-butandiol, or a combination thereof. The disclosed technology provides for the described integrated article where the polyol includes polytetramethylene ether glycol. The disclosed technology provides for the described integrated article where the polyol includes a butanediol adipate polyester polyol, an ethylene glycol adipate polyester polyol, a mixed ethylene glycol butanediol adipate ester, or any combination thereof. The disclosed technology provides for the described integrated article where the isocyanate includes 4,4'-methylene diphenyl diisocyanate. The disclosed technology also provides for the described integrated article where the chain extender includes benzene glycol, 1,4-butanediol, or a combination thereof; the polyol includes polytetramethylene ether glycol; and the isocyanate includes 4,4'-methylene diphenyl diisocyanate. The disclosed technology also provides for the described integrated article where the chain extender includes benzene glycol, 1,4-butanediol, or a combination thereof; the polyol includes butanediol adipate polyester polyol, an ethylene glycol adipate polyester polyol, a mixed ethylene glycol butanediol adipate ester or a combination thereof; and the isocyanate includes 4,4'-methylene diphenyl diisocyanate.

The disclosed technology provides for the described integrated article where the article is used to build an article of footwear. The disclosed technology provides for such footwear as including: a) the integrated midsole outsole described above, and b) a upper bonded to the integrated outsole and midsole.

The disclosed technology provides a process of making any of the integrated articles described herein, where the process includes (I) forming a non-foam part from said polyurethane composition; and (II) forming a flexible foam part from said polyurethane composition directly on said non-foam part; resulting in an integrated article.

The disclosed technology provides for the described process where the flexible foam region is a midsole, and wherein the non-foam region is an outsole.

The disclosed technology provides for the described process where the polyurethane composition includes the reaction product of: (i) at least one polyol, (ii) at least one isocyanate, and (iii) at least one chain extender; and where the polyurethane composition is injection foam molded to form said flexible foam part, and wherein said polyurethane composition is injection molded to form said non-foam part.

The disclosed technology provides for the described process where the foamed polyurethane composition of said flexible foam region has a weight average molecular weight of 120,000 to 500,000, and a polydispersity (Mw/Mn) of 1.85 to 2.51; and where the non-foamed polyurethane composition of the non-foam region has a weight average molecular weight of 200,000 to 350,000, and a polydispersity (Mw/Mn) of 2.30 to 2.50, or in other embodiments a weight average molecular weight of 200,000 to 230,000, and a polydispersity (Mw/Mn) of 2.30 to 2.33.

The disclosed technology provides for the described process where the foamed polyurethane composition of said flexible foam region has: (i) a vertical rebound, as measured by ASTM D2632, of at least 35%; (ii) a compression set at room temperature, as measured by ASTM D395, of no more than 8%; (iii) a compression set at 50° C., as measured by ASTM D395, of no more than 45%; and (iv) an Asker C hardness, as measured by ASTM D2240, of 35 to 60 or even 46 to 60.

The disclosed technology provides for the described process where the non-foamed polyurethane composition of said non-foam region has: (i) a volume loss at room temperature, as measured by the DIN abrasion test, of less than 100 mm$^3$; (ii) a volume loss at 65° C., as measured by the DIN abrasion test, of less than 100 mm$^3$; (iii) a dry coefficient of friction, as measured by the Plint COF test, of at least 0.5; and (iv) a wet coefficient of friction, as measured by the Plint COF test, of at least 0.5.

DETAILED DESCRIPTION

Various preferred features and embodiments will be described below by way of non-limiting illustration.

The disclosed technology provides an integrated article that includes (a) a flexible foam region and (b) a non-foam region. The flexible foam region and the non-foam region comprise a polyurethane composition and in some embodiments the same polyurethane composition.

The Polyurethane

The polyurethane compositions useful herein are the reaction product of (i) at least one polyol, (ii) at least one isocyanate, and (iii) at least one chain extender.

The Polyol Component

The polyurethane compositions are made using a reaction system that includes a polyol. Suitable polyols include polyether polyols, polyester polyols, polycarbonate polyols, polysiloxane polyols, and combinations thereof.

Suitable polyols, which may also be described as hydroxyl terminated intermediates, when present, may include one or more hydroxyl terminated polyesters, one or more hydroxyl terminated polyethers, one or more hydroxyl terminated polycarbonates, one or more hydroxyl terminated polysiloxanes, or mixtures thereof. Suitable polyols may also include amine terminated polyols.

Suitable hydroxyl terminated polyester intermediates include linear polyesters having a number average molecular weight ($M_n$) of from about 500 to about 10,000, from about 700 to about 5,000, or from about 700 to about 4,000, and generally have an acid number less than 1.3 or less than 0.5. The molecular weight is determined by assay of the terminal functional groups and is related to the number average molecular weight. The polyester intermediates may be produced by (1) an esterification reaction of one or more glycols with one or more dicarboxylic acids or anhydrides or (2) by transesterification reaction, i.e., the reaction of one or more glycols with esters of dicarboxylic acids. Mole ratios generally in excess of more than one mole of glycol to acid are preferred so as to obtain linear chains having a preponderance of terminal hydroxyl groups. Suitable polyester intermediates also include various lactones such as polycaprolactone typically made from ε-caprolactone and a bifunctional initiator such as diethylene glycol. The dicarboxylic acids of the desired polyester can be aliphatic, cycloaliphatic, aromatic, or combinations thereof. Suitable dicarboxylic acids which may be used alone or in mixtures generally have a total of from 4 to 15 carbon atoms and include: succinic, glutaric, adipic, pimelic, suberic, azelaic, sebacic, dodecanedioic, isophthalic, terephthalic, cyclohexane dicarboxylic, dimer (C36 dimer acid) and the like. Anhydrides of the above dicarboxylic acids such as phthalic anhydride, tetrahydrophthalic anhydride, or the like, can also be used. Adipic acid is a preferred acid. The glycols which are reacted to form a desirable polyester intermediate can be aliphatic, aromatic, or combinations thereof, including any of the glycols described above in the chain extender section, and have a total of from 2 to 20 or from 2 to 12 carbon atoms. Suitable examples include ethylene glycol (EG), 1,2-propanediol, 1,3-propanediol, 1,3-butanediol, 1,4-butanediol (BDO), 1,5-pentanediol, 1,6-hexanediol (HDO), 2,2-dimethyl-1,3-propanediol, 1,4-cyclohexanedimethanol, decamethylene glycol, dodecamethylene glycol, and mixtures thereof.

The polyol component may also include one or more polycaprolactone polyester polyols. The polycaprolactone polyester polyols useful in the technology described herein include polyester diols derived from caprolactone monomers. The polycaprolactone polyester polyols are terminated by primary hydroxyl groups. Suitable polycaprolactone polyester polyols may be made from ε-caprolactone and a bifunctional initiator such as diethylene glycol, 1,4-butanediol, or any of the other glycols and/or diols listed herein. In some embodiments, the polycaprolactone polyester polyols are linear polyester diols derived from caprolactone monomers (CAPA).

Useful examples include CAPA™ 2202A, a 2000 number average molecular weight (Mn) linear polyester diol, and CAPA™ 2302A, a 3000 Mn linear polyester diol, both of which are commercially available from Perstorp Polyols Inc. These materials may also be described as polymers of 2-oxepanone and 1,4-butanediol.

The polycaprolactone polyester polyols may be prepared from 2-oxepanone and a diol, where the diol may be 1,4-butanediol, diethylene glycol, monoethylene glycol, 1,6-hexanediol, 2,2-dimethyl-1,3-propanediol, or any combination thereof. In some embodiments, the diol used to prepare the polycaprolactone polyester polyol is linear. In some embodiments, the polycaprolactone polyester polyol is prepared from 1,4-butanediol. In some embodiments, the polycaprolactone polyester polyol has a number average molecular weight from 500 to 10,000, or from 500 to 5,000, or from 1,000 or even 2,000 to 4,000 or even 3000.

Suitable hydroxyl terminated polyether intermediates include polyether polyols derived from a diol or polyol having a total of from 2 to 15 carbon atoms, in some embodiments an alkyl diol or glycol which is reacted with an ether comprising an alkylene oxide having from 2 to 6 carbon atoms, typically ethylene oxide or propylene oxide or mixtures thereof. For example, hydroxyl functional polyether can be produced by first reacting propylene glycol with propylene oxide followed by subsequent reaction with ethylene oxide. Primary hydroxyl groups resulting from ethylene oxide are more reactive than secondary hydroxyl groups and thus are preferred. Useful commercial polyether polyols include poly(ethylene glycol) comprising ethylene oxide reacted with ethylene glycol, poly(propylene glycol) comprising propylene oxide reacted with propylene glycol, poly(tetramethylene ether glycol) comprising water reacted with tetrahydrofuran which can also be described as polymerized tetrahydrofuran, and which is commonly referred to as PTMEG. In some embodiments, the polyether intermediate includes PTMEG. Suitable polyether polyols also include polyamide adducts of an alkylene oxide and can include, for example, ethylenediamine adduct comprising the reaction product of ethylenediamine and propylene oxide, diethylenetriamine adduct comprising the reaction product of diethylenetriamine with propylene oxide, and similar polyamide type polyether polyols. Copolyethers can also be utilized in the described compositions. Typical copolyethers include the reaction product of THF and ethylene oxide or THF and propylene oxide. These are available from BASF as PolyTHF® B, a block copolymer, and poly THF® R, a random copolymer. The various polyether intermediates generally have a number average molecular weight ($M_n$) as determined by assay of the terminal functional groups which is an average molecular weight greater than about 700, such as from about 700 to about 10,000, from about 1,000 to about 5,000, or from about 1,000 to about 2,500. In some embodiments, the polyether intermediate includes a blend of two or more different molecular weight polyethers, such as a blend of 2,000 $M_n$ and 1000 $M_n$ PTMEG.

Suitable hydroxyl terminated polycarbonates include those prepared by reacting a glycol with a carbonate. U.S. Pat. No. 4,131,731 is hereby incorporated by reference for its disclosure of hydroxyl terminated polycarbonates and their preparation. Such polycarbonates are linear and have terminal hydroxyl groups with essential exclusion of other terminal groups. The essential reactants are glycols and carbonates. Suitable glycols are selected from cycloaliphatic and aliphatic diols containing 4 to 40, and or even 4 to 12 carbon atoms, and from polyoxyalkylene glycols containing 2 to 20 alkoxy groups per molecule with each alkoxy group containing 2 to 4 carbon atoms. Suitable diols include aliphatic diols containing 4 to 12 carbon atoms such as 1,4-butanediol, 1,5-pentanediol, neopentyl glycol, 1,6-hexanediol, 2,2,4-trimethyl-1,6-hexanediol, 1,10-decanediol, hydrogenated dilinoleylglycol, hydrogenated dioleylglycol, 3-methyl-1,5-pentanediol; and cycloaliphatic diols such as 1,3-cyclohexanediol, 1,4-dimethylolcyclohexane, 1,4-cyclohexanediol-, 1,3-dimethylolcyclohexane-, 1,4-endomethylene-2-hydroxy-5-hydroxymethyl cyclohexane, and polyalkylene glycols. The diols used in the reaction may be a single diol or a mixture of diols depending on the properties desired in the finished product. Polycarbonate intermediates which are hydroxyl terminated are generally those known to the art and in the literature. Suitable carbonates are selected from alkylene carbonates composed of a 5 to 7 member ring. Suitable carbonates for use herein include ethylene carbonate, trimethylene carbonate, tetramethylene carbonate, 1,2-propylene carbonate, 1,2-butylene carbonate, 2,3-butylene carbonate, 1,2-ethylene carbonate, 1,3-pentylene carbonate, 1,4-pentylene carbonate, 2,3-pentylene carbonate, and 2,4-pentylene carbonate. Also, suitable herein are dialkylcarbonates, cycloaliphatic carbonates, and diarylcarbonates. The dialkylcarbonates can contain 2 to 5 carbon atoms in each alkyl group and specific examples thereof are diethylcarbonate and dipropylcarbonate. Cycloaliphatic carbonates, especially dicycloaliphatic carbonates, can contain 4 to 7 carbon atoms in each cyclic structure, and there can be one or two of such structures. When one group is cycloaliphatic, the other can be either alkyl or aryl. On the other hand, if one group is aryl, the other can be alkyl or cycloaliphatic. Examples of suitable diarylcarbonates, which can contain 6 to 20 carbon atoms in each aryl group, are diphenyl carbonate, ditolylcarbonate, and dinaphthylcarbonate.

Suitable polysiloxane polyols include alpha-omega-hydroxyl or amine or carboxylic acid or thiol or epoxy terminated polysiloxanes. Examples include poly(dimethysiloxane) terminated with a hydroxyl or amine or carboxylic acid or thiol or epoxy group. In some embodiments, the polysiloxane polyols are hydroxyl terminated polysiloxanes. In some embodiments, the polysiloxane polyols have a number-average molecular weight in the range from 300 to 5,000, or from 400 to 3,000.

Polysiloxane polyols may be obtained by the dehydrogenation reaction between a polysiloxane hydride and an aliphatic polyhydric alcohol or polyoxyalkylene alcohol to introduce the alcoholic hydroxy groups onto the polysiloxane backbone.

In some embodiments, the polysiloxanes may be represented by one or more compounds having the following formula:

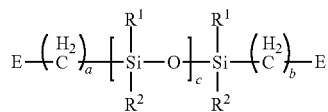

in which: each $R^1$ and $R^2$ are independently a 1 to 4 carbon atom alkyl group, a benzyl, or a phenyl group; each E is OH or $NHR^3$ where $R^3$ is hydrogen, a 1 to 6 carbon atoms alkyl group, or a 5 to 8 carbon atoms cyclo-alkyl group; a and b are each independently an integer from 2 to 8; c is an integer from 3 to 50. In amino-containing polysiloxanes, at least one of the E groups is $NHR^3$. In the hydroxyl-containing polysiloxanes, at least one of the E groups is OH. In some embodiments, both $R^1$ and $R^2$ are methyl groups.

Suitable examples include alpha-omega-hydroxypropyl terminated poly(dimethysiloxane) and alpha-omega-amino propyl terminated poly(dimethysiloxane), both of which are commercially available materials. Further examples include copolymers of the poly(dimethysiloxane) materials with a poly(alkylene oxide).

The polyol component, when present, may include poly(ethylene glycol), poly(tetramethylene ether glycol), poly(trimethylene oxide), ethylene oxide capped poly(propylene glycol), poly(butylene adipate), poly(ethylene adipate), poly(hexamethylene adipate), poly(tetramethylene-co-hexamethylene adipate), poly(3-methyl-1,5-pentamethyl ene adipate), polycaprolactone diol, poly(hexamethylene carbonate) glycol, poly(pentamethylene carbonate) glycol, poly(trimethylene carbonate) glycol, dimer fatty acid based polyester polyols, vegetable oil based polyols, or any combination thereof. Suitable dimerates, prepared from dimer acid, are also suitable.

Examples of dimer fatty acids that may be used to prepare suitable polyester polyols include Priplast™ polyester glycols/polyols commercially available from Croda and Radia® polyester glycols commercially available from Oleon.

In some embodiments, the polyol component includes a polyether polyol, a polycarbonate polyol, a polycaprolactone polyol, or any combination thereof.

In some embodiments, the polyol component includes a polyether polyol. In some embodiments, the polyol component is essentially free of or even completely free of polyester polyols. In some embodiments, the polyol component used to prepare the TPU is substantially free of, or even completely free of polysiloxanes.

In some embodiments, the polyol component includes ethylene oxide, propylene oxide, butylene oxide, styrene oxide, poly(tetramethylene ether glycol), poly(propylene glycol), poly(ethylene glycol), copolymers of poly(ethylene glycol) and poly(propylene glycol), epichlorohydrin, and the like, or combinations thereof. In some embodiments, the polyol component includes poly(tetramethylene ether glycol).

In some embodiments, the polyol has a number average molecular weight of at least 900. In other embodiments, the polyol has a number average molecular weight of at least 900, 1,000, 1,500, 1,750, and/or a number average molecular weight up to 5,000, 4,000, 3,000, 2,500, or even 2,000.

In some embodiments, the polyol component comprises a polyether polyol, and in some embodiments that polyether polyol is poly(tetramethylene ether glycol), which is also referred to as PTMEG.

In some embodiments, the polyol component comprises a polyester polyol, and in some embodiments that polyester polyol is the reaction of a diol and adipic acid to form an alkyl adipate. In some embodiments, the polyester polyol is polybutylene adipate, polyethylene glycol adipate, an adipate made from a mixture of butanediol and ethylene glycol, or a combination thereof.

In some embodiments, the polyol component comprises a polycaprolactone polyol. In some embodiments the polycaprolactone polyester polyols are linear polyester diols derived from caprolactone monomers.

The Polyisocyanate

The polyurethane compositions are made using a reaction system that includes an isocyanate. Suitable isocyanates polyisocyanate, which may include one or more polyisocyanates. In some embodiments, the polyisocyanate component includes one or more diisocyanates.

Suitable polyisocyanates include aromatic diisocyanates, aliphatic diisocyanates, or combinations thereof. In some embodiments, the polyisocyanate component includes one or more aromatic diisocyanates. In some embodiments, the polyisocyanate component is essentially free of, or even completely free of, aliphatic diisocyanates.

Examples of useful polyisocyanates include aromatic diisocyanates such as 4,4'-methylenebis(phenyl isocyanate) (MDI), m-xylene diisocyanate (XDI), phenylene-1,4-diisocyanate, naphthalene-1,5-diisocyanate, and toluene diisocyanate (TDI); as well as aliphatic diisocyanates such as isophorone diisocyanate (IPDI), 1,4-cyclohexyl diisocyanate (CHDI), decane-1,10-diisocyanate, lysine diisocyanate (LDI), 1,4-butane diisocyanate (BDI), isophorone diisocyanate (PDI), 3,3'-Dimethyl-4,4'-biphenylene diisocyanate (TODI), 1,5-naphthalene diisocyanate (NDI), and dicyclohexylmethane-4,4'-diisocyanate (H12MDI). Mixtures of two or more polyisocyanates may be used. In some embodiments, the polyisocyanate is MDI and/or H12MDI. In some embodiments, the polyisocyanate includes MDI. In some embodiments, the polyisocyanate may include H12MDI. In some embodiments, the polyisocyanate component is essentially free of, or even completely free of, hexamethylene diisocyanate (HDI).

In some embodiments, the thermoplastic polyurethane is prepared with a polyisocyanate component that includes MDI. In some embodiments, the thermoplastic polyurethane is prepared with a polyisocyanate component that consists essentially of MDI. In some embodiments, the thermoplastic polyurethane is prepared with a polyisocyanate component that consists of MDI.

In some embodiments, the thermoplastic polyurethane is prepared with a polyisocyanate component that includes (or consists essentially of, or even consists of) MDI and at least one of H12MDI, HDI, TDI, IPDI, LDI, BDI, PDI, CHDI, TODI, and NDI. In some embodiments, the polyisocyanate includes MDI, H12MDI, HDI, or any combination thereof.

The Chain Extender

The polyurethane compositions are made using a reaction system that includes a chain extender. Suitable chain extenders include diols, diamines, and combinations thereof.

Suitable chain extenders include relatively small polyhydroxy compounds, for example lower aliphatic or short chain glycols having from 2 to 20, or 2 to 12, or 2 to 10 carbon atoms. Suitable examples include ethylene glycol, diethylene glycol, propylene glycol, dipropylene glycol, 1,4-butanediol (BDO), 1,6-hexanediol (HDO), 1,3-butanediol, 1,5-pentanediol, neopentylglycol, 1,4-cyclohexanedimethanol (CHDM), 2,2-bis[4-(2-hydroxyethoxy)phenyl]propane (HEPP), hexamethylenediol, heptanediol, nonanediol, dodecanediol, 3-methyl-L5-pentanediol, ethylenediamine, butanediamine, hexamethylenediamine, and hydroxyethyl resorcinol (HER), and the like, as well as mixtures thereof. In some embodiments, the chain extender includes BDO, HDO, 3-methyl-1,5-pentanediol, or a combination thereof. In some embodiments, the chain extender includes BDO. Other glycols, such as aromatic glycols could be used, but in some embodiments the polyurethane described herein, which may also be described as thermoplastic polyurethane (TPU), are essentially free of or even completely free of such materials.

In some embodiments, the chain extender used to prepare the TPU is substantially free of, or even completely free of, 1,6-hexanediol. In some embodiments, the chain extender used to prepare the TPU includes a cyclic chain extender. Suitable examples include CHDM, HEPP, HER, and combinations thereof. In some embodiments, the chain extender used to prepare the TPU includes an aromatic cyclic chain extender, for example HEPP, HER, or a combination thereof. In some embodiments, the chain extender used to prepare the TPU includes an aliphatic cyclic chain extender, for example CHDM. In some embodiments, the chain extender used to prepare the TPU is substantially free of, or even completely free of aromatic chain extenders, for example, aromatic cyclic chain extenders. In some embodiments, the chain extender used to prepare the TPU is substantially free of, or even completely free of polysiloxanes.

In some embodiments, the chain extender component includes 1,4-butanediol, 2-ethyl-1,3-hexanediol, 2,2,4-trimethyl pentane-1,3-diol, 1,6-hexanediol, 1,4-cyclohexane dimethylol, 1,3-propanediol, 3-methyl-1,5-pentanediol, butyl ethyl propane diol (BEPD), or combinations thereof. In some embodiments, the chain extender component includes 1,4-butanediol, 3-methyl-1,5-pentanediol or combinations thereof. In some embodiments, the chain extender component includes 1,4-butanediol.

In some embodiments, the chain extender component comprises a linear alkylene diol. In some embodiments, the chain extender component comprises 1,4-butanediol, dipropylene glycol, or a combination of the two. In some embodiments, the chain extender component comprises 1,4-butanediol.

In some embodiments, aromatic glycols are used as the chain extender and are often the choice for high heat applications. Benzene glycol (HQEE) and xylylene glycols are suitable chain extenders. Xylylene glycol is a mixture of 1,4-di(hydroxymethyl) benzene and 1,2-di(hydroxymethyl) benzene. Benzene glycol is one suitable aromatic chain extender and specifically includes hydroquinone, i.e., bis(beta-hydroxyethyl) ether also known as 1,4-di(2-hydroxyethoxy) benzene; resorcinol, i.e., bis(beta-hydroxyethyl) ether also known as 1,3-di(2-hydroxyethyl) benzene; catechol, i.e., bis(beta-hydroxyethyl) ether also known as 1,2-di(2-hydroxyethoxy) benzene; and combinations thereof.

Suitable chain extenders also include diamine chain extenders. Suitable diamine chain extenders can be aliphatic or aromatic in nature, such as alkylenediamines of from 1-30 carbon atoms (e.g., ethylenediamine, butanediamine, hexamethylenediamine).

In some embodiments, the mole ratio of the chain extender to the polyol is greater than 1.5. In other embodiments, the mole ratio of the chain extender to the polyol is at least (or greater than) 1.5, 2.0, 3.5, 3.7, or even 3.8 and/or the mole ratio of the chain extender to the polyol may go up to 5.0, or even 4.0.

In some embodiments, the chain extender component includes HQEE, 1,4-butanediol, 1,6-hexanediol, 1-12-dodecanediol, or any combination thereof. In some embodiments, the chain extender component includes HQEE, 1,4-butanediol, or any combination thereof.

Additional Items

The polyurethane composition used to prepare the flexible foam regions and/or non-foam regions described herein may further include a blowing agent (at least in the polyurethane composition used in the foam regions) and/or a cell opening surfactant. One or more other materials and/or additives may also be present in the reaction system and/or mixed with the polyurethane produced by the reaction system.

In some embodiments, the blowing agent includes water. Suitable blowing agents include: linear, branched or cyclic $C_1$-$C_6$ hydrocarbons; a linear, branched or cyclic $C_1$-$C_6$ (hydro)fluorocarbon; $N_2$; $O_2$; argon; $CO_2$; or any combination thereof.

Suitable cell opening surfactant includes one or more silicones, siloxane copolymers, non-siloxane co-polymers, non-silicones, or any combination thereof.

Suitable blowing agent include chlorofluorocarbons (CFC's), hydrochlorofluorocarbons (HCFC's), hydrofluorocarbons (HFC's), hydrofluoro ethers (HFE's), hydrofluoro olefins (HFO's), methylene chloride, hydrocarbons, alkyl alkanoates, or other organic compounds.

The concentration of blowing agent(s) in the foam and/or reaction system may be from about 0.5% by weight to about 15% by weight, or about 0.5% by weight to about 12% by weight, or even about 2% by weight to about 10% by weight. The surfactant can make up less than about 4% by weight, or 0.75% by weight, of the foam and/or reaction system.

The cell opening surfactant promotes cell opening of the foam and results in a foam that is at least 50% open cell. Examples of cell opening surfactants include silicones and siloxane copolymers, such as Niax L-6164, DC-5160, DC-5125, DC 5241, B-8021, L-620, L-6202 (Degussa/Goldschmidt Chemical Corp.; Mapleton, Ill.); L-620 (Union Carbide; Houston, Tex.); L-6202 and Y-10390 (Air Products; Allentown, Pa.) or non-siloxane copolymers such, as Ortegol® 500 or Ortegol® 501 and non-silicones.

The composition may further comprise a surfactant that promotes cell closing. Examples of cell closing surfactants include silicones and siloxane copolymers, such as B8404, DC-193, DC-5598, L5440, L6900 and Silstab 2000, and non-silicones.

The concentration of cell opening surfactant in the foam and/or reaction system can be from about 0.10% to about 4.0% by weight, or about 0.10% to about 1.0% by weight, or even from about 0.20% to about 0.70% by weight. If a cell closing surfactant is present, it typically makes up from about 0.10% to about 4.0% by weight, or about 0.50% to about 3.0% by weight. One skilled in the art can adjust the concentrations of the cell opening surfactant and the cell closing surfactant in order to obtain the desired density, compressive strength, and buoyancy of the resultant foam.

The reaction system used to prepare the described polyurethane compositions may further include a nucleating agent. Nucleating agents serve primarily to increase cell count and decrease cell size in the foam, and may be used in an amount of about 0.1 to about 10 parts by weight per 100 parts by weight of the resin. Suitable nucleating agents include talc, sodium bicarbonate-citric acid mixtures, calcium silicate, carbon dioxide, or any combination thereof.

As noted above, the blowing agents and/or a cell opening surfactants which may be utilized in the described foam composition may be added to the reaction system and be present during the reaction that forms the polyurethane, or may be added to the polyurethane that results from the reaction system. In such embodiments the polyurethane may be formed in a separate step. The blowing agents and/or cell opening surfactants may be added to the polyurethane. In some embodiments, the agents and/or cell opening surfactants are added to a polyurethane melt just before injection into the mold. Unless otherwise noted, the additional components described below may also be added to the reaction system or to the polyurethane the results from the system.

The polyurethane compositions described herein may contain one or more additional components. These additional components include other polymeric materials that may be blended with the TPU described herein. These additional components include one or more additives that may be added to the polymer composition, or blend, to impact the properties of the composition.

The polyurethane compositions described herein may also be blended with one or more other polymers. The polymers with which the polyurethane compositions described herein may be blended are not overly limited. In some embodiments, the described compositions include a two or more of the described polyurethane compositions. In some embodiments, the compositions include at least one of the described TPU materials and at least one other polymer, which is not one of the described polyurethane compositions.

Polymers that may be used in combination with the polyurethane compositions described herein also include more conventional polyurethane compositions such as non-caprolactone polyester-based thermoplastic polyurethane (TPU), polyether-based TPU, or TPU containing both non-caprolactone polyester and polyether groups. Other suitable materials that may be blended with the TPU materials described herein include polycarbonates, polyolefins, styrenic polymers, acrylic polymers, polyoxymethylene polymers, polyamides, polyphenylene oxides, polyphenylene sulfides, polyvinylchlorides, chlorinated polyvinylchlorides, polylactic acids, or combinations thereof.

Polymers for use in the blends described herein include homopolymers and copolymers. Suitable examples include: (i) a polyolefin (PO), such as polyethylene (PE), polypropylene (PP), polybutene, ethylene propylene rubber (EPR), polyoxyethylene (POE), cyclic olefin copolymer (COC), or combinations thereof; (ii) a styrenic, such as polystyrene (PS), acrylonitrile butadiene styrene (ABS), styrene acrylonitrile (SAN), styrene butadiene rubber (SBR or HIPS), polyalphamethylstyrene, styrene maleic anhydride (SMA), styrene-butadiene copolymer (SBC) (such as styrene-butadiene-styrene copolymer (SBS) and styrene-ethyl ene/butadiene-styrene copolymer (SEBS)), styrene-ethylene/propylene-styrene copolymer (SEPS), styrene butadiene latex (SBL), SAN modified with ethylene propylene diene monomer (EPDM) and/or acrylic elastomers (for example, PS-SBR copolymers), or combinations thereof; (iii) a thermoplastic polyurethane (TPU) other than those described above; (iv) a polyamide, such as Nylon™, including polyamide 6,6 (PA66), polyamide 1,1 (PA11), polyamide 1,2 (PA12), a copolyamide (COPA), or combinations thereof; (v) an acrylic polymer, such as polymethyl acrylate, polymethylmethacrylate, a methyl methacrylate styrene (MS) copolymer, or combinations thereof; (vi) a polyvinylchloride (PVC), a chlorinated polyvinylchloride (CPVC), or combinations thereof; (vii) a polyoxyemethylene, such as polyacetal; (viii) a polyester, such as polyethylene terephthalate (PET), polybutylene terephthalate (PBT), copolyesters and/or polyester elastomers (COPE) including polyether-ester block copolymers such as glycol modified polyethylene terephthalate (PETG), polylactic acid (PLA), polyglycolic acid (PGA), copolymers of PLA and PGA, or combinations thereof; (ix) a polycarbonate (PC), a polyphenylene sulfide (PPS), a polyphenylene oxide (PPO), or combinations thereof; or combinations thereof.

In some embodiments, these blends include one or more additional polymeric materials selected from groups (i), (iii), (vii), (viii), or some combination thereof. In some embodiments, these blends include one or more additional polymeric materials selected from group (i). In some embodiments, these blends include one or more additional polymeric materials selected from group (iii). In some embodiments, these blends include one or more additional polymeric materials selected from group (vii). In some embodiments, these blends include one or more additional polymeric materials selected from group (viii).

The additional additives suitable for use in the polyurethane compositions described herein are not overly limited. Suitable additives include pigments, UV stabilizers, UV absorbers, antioxidants, lubricity agents, heat stabilizers, hydrolysis stabilizers, cross-linking activators, flame retardants, layered silicates, fillers, colorants, reinforcing agents, adhesion mediators, impact strength modifiers, antimicrobials, and any combination thereof.

In some embodiments, the additional component is a flame retardant. Suitable flame retardants are not overly limited and may include a boron phosphate flame retardant, a magnesium oxide, a dipentaerythritol, a polytetrafluoroethylene (PTFE) polymer, or any combination thereof. In some embodiments, this flame retardant may include a boron phosphate flame retardant, a magnesium oxide, a dipentaerythritol, or any combination thereof. A suitable example of a boron phosphate flame retardant is BUDIT 326, commercially available from Budenheim USA, Inc. When present, the flame retardant component may be present in an amount from 0 to 10 weight percent of the overall polyurethane compositions, in other embodiments from 0.5 to 10, or from 1 to 10, or from 0.5 or 1 to 5, or from 0.5 to 3, or even from 1 to 3 weight percent of the overall polyurethane compositions.

The polyurethane compositions described herein may also include additional additives, which may be referred to as a stabilizer. The stabilizers may include antioxidants such as phenolics, phosphites, thioesters, and amines, light stabilizers such as hindered amine light stabilizers and benzothiazole UV absorbers, and other process stabilizers and combinations thereof. In one embodiment, the preferred stabilizer is Irganox® 1010 from BASF and Naugard® 445 from Chemtura. The stabilizer is used in the amount from about 0.1 weight percent to about 5 weight percent, in another embodiment from about 0.1 weight percent to about 3 weight percent, and in another embodiment from about 0.5 weight percent to about 1.5 weight percent of the polyurethane compositions.

In addition, various conventional inorganic flame retardant components may be employed in the polyurethane compositions. Suitable inorganic flame retardants include any of those known to one skilled in the art, such as metal oxides, metal oxide hydrates, metal carbonates, ammonium phosphate, ammonium polyphosphate, calcium carbonate, antimony oxide, clay, mineral clays including talc, kaolin, wollastonite, nanoclay, montmorillonite clay which is often referred to as nano-clay, and mixtures thereof. In one embodiment, the flame retardant package includes talc. The talc in the flame retardant package promotes properties of high limiting oxygen index (LOI). The inorganic flame retardants may be used in the amount from 0 to about 30 weight percent, from about 0.1 weight percent to about 20 weight percent, in another embodiment about 0.5 weight percent to about 15 weight percent of the total weight of the polyurethane compositions.

Still further optional additives may be used in the polyurethane compositions described herein. The additives include colorants, antioxidants (including phenolics, phosphites, thioesters, and/or amines), antiozonants, stabilizers, inert fillers, lubricants, inhibitors, hydrolysis stabilizers, light stabilizers, hindered amines light stabilizers, benzotriazole UV absorber, heat stabilizers, stabilizers to prevent discoloration, dyes, pigments, inorganic and organic fillers, reinforcing agents and combinations thereof.

All of the additives described above may be used in an effective amount customary for these substances. The non-flame retardants additives may be used in amounts of from about 0 to about 30 weight percent, in one embodiment from about 0.1 to about 25 weight percent, and in another embodiment about 0.1 to about 20 weight percent of the total weight of the polyurethane compositions.

These additional additives can be incorporated into the components of, or into the reaction mixture for, the preparation of the polyurethane composition, or after making the polyurethane composition.

In some embodiments, there is an adhesive between the flexible foam region and the non-foam region, while on other embodiments there is no adhesive and the flexible foam region and the non-foam region are integrated by the manufacturing process alone. In some embodiments, the flexible foam region is an insole, and the non-foam region is an outsole.

The Flexible Foam Region.

The integrated articles described herein include a flexible foam region. The flexible foam region includes a polyurethane composition, where useful polyurethane compositions include any of those described above. In some embodiments, the polyurethane composition is injection foam molded to form the flexible foam region.

The foamed polyurethane composition of said flexible foam region may have a weight average molecular weight of 120,000 to 500,000, and a polydispersity (Mw/Mn) of 1.85 to 2.51. In other embodiments, the foamed polyurethane composition of said flexible foam region may have a weight average molecular weight of 100,000 to 500,000 or even from 150,000 to 300,000, or even from 200,000 to 350,000, or from 200,000 to 230,000. The non-foam polyurethane of the non-foam region may have a polydispersity (Mw/Mn) of 2.30 to 2.50 or from 2.30 to 2.33.

The foamed polyurethane composition of said flexible foam region may have: (i) a vertical rebound, as measured by ASTM D2632, of at least 35 percent or even at least 40 or even 50, or in some embodiments from 35 to 50, 35 to 45, 35 to 43, or even 40 to 41, and in still further embodiments from 40 to 60 percent; (ii) a compression set at room temperature, as measured by ASTM D395, of no more than 8 percent or even no more than 10 or even 6 percent, or in some embodiments from 4 to 8, or 5 to 8, or 4 to 6, or even 5 to 6 percent; (iii) a compression set at 50° C., as measured by ASTM D395, of no more than 45 percent or even less than 70, 60, 50, or even 45, or even from 20 to 45 or 20 to 35, or 25 to 35, or even 30 to 35 percent; and (iv) an Asker C hardness, as measured by ASTM D2240, of 46 to 60 or even from 40 to 60, or from 45 to 80, or 45 to 70, or 46 to 70, or 46 to 60, or from 48 to 51.

The foamed polyurethane composition of said flexible foam region may have: (i) a hard segment content of from 23.5 to 45.0 percent by weight, and the polyol component comprises a polyether polyol; (ii) a hard segment content of from 24 to 30 percent by weight, and the polyol component comprises a polyester polyol; or (iii) a hard segment content of greater than 30 percent by weight, and the polyol component comprises a polycaprolactone polyol. The hard segment content of a polyurethane is the total weight percent content of chain extender and isocyanate used to make the polyurethane, generally excluding any components that do not participate in the reaction that forms the polyurethane.

In some embodiments, the polyurethane composition of the flexible foam region is prepared from: a chain extender that includes benzene glycol, 1,4-butanediol, or a combination thereof; a polyol that includes polytetramethylene ether glycol; and an isocyanate that includes 4,4'-methylene diphenyl diisocyanate. In other embodiments, the chain extender includes benzene glycol, 1,4-butanediol, or a combination thereof; the polyol includes butanediol adipate polyester polyol, an ethylene glycol adipate polyester polyol, a mixed ethylene glycol butanediol adipate ester or a combination thereof; and the isocyanate includes 4,4'-methylene diphenyl diisocyanate.

The polyurethane formed by the described reaction system, and which has the described properties, is well suited to be processed into a flexible polyurethane foam. Many polyurethanes are not so well suited and form poor foams, or even no foams at all. In some embodiments, the flexible polyurethane foams described herein may include two or more polyurethanes made from two or more reaction systems. The described reaction system and resulting polyurethane may of course only apply to one of the polyurethanes present in such systems, but in some embodiments they could apply to both independently. Further, it is noted that crosslinking agents and similar materials may be used with the polyurethanes described herein, however, the properties of the polyurethanes, including their weight average molecular weight and dispersity, are in regards to the materials before any crosslinking agents or similar materials are applied, unless otherwise noted.

In some embodiments, the polyurethane composition of the flexible foam region has: (i) a peak temperature of crystallization, as measured by DSC, between 40° C. and 205° C., or even 42 to 204, 70 to 120, 78 to 100, or even 79 to 100° C.; (ii) a peak temperature of melting, as measured by DSC, between 106° C. and 206° C., or even from 132 to 206, 135 to 206, 138 to 182, or even 138 to 168° C.; (iii) a difference between the peak temperature of melting and the peak temperature of crystallization, each as measured by DSC, between 1 degree and 137 degrees, or even from 1.9 to 105, 24 to 104, or even 48 to 70 degrees; and (iv) a melt strength, as measured by Rheotens, between 0.003 and 0.6 N, or even from 0.003 to 0.6, 0.004 to 0.6, 0.04 to 0.5, or even 0.04 to 0.2 N.

In further embodiments, the polyurethane composition of the flexible foam region has: a hard segment content of from 23.5 to 45.0 percent by weight or even from 23.9 to 43.3, or from 23.9 to 40.3, or even from 23.9 to 27.8; and the polyol component includes a polyether polyol which in some embodiments includes PTMEG.

In still further embodiments, the polyurethane composition of the flexible foam region has: a hard segment content of from 23.5 to 45.0 percent by weight, and the polyol component comprises a polyether polyol; a hard segment content of from 24 to 30 percent by weight, and the polyol component comprises a polyester polyol; or a hard segment content of greater than 30 percent by weight, and the polyol component comprises a polycaprolactone polyol.

In still further embodiments, some of the flexible polyurethane injection molded foams described herein have: a hard segment content of from 24 to 30 percent by weight, and the polyol component includes a polyester polyol.

In still further embodiments, some of the flexible polyurethane injection molded foams described herein have: a hard segment content of more than 30 percent by weight or even from 30 to 50 or from 40 to 50 percent by weight; and the polyol component includes a polycaprolactone polyol.

Such flexible polyurethane injection molded foams as those described above provide not only good foam processing properties but also a good balance of physical properties making them particularly well suited for a variety of applications, including but not limited to shoe soles, mid soles and in soles in particular.

The Non-Foam Region.

The integrated articles described herein include a non-foam region. The non-foam region includes a polyurethane composition, where useful polyurethane compositions include any of those described above.

The non-foamed polyurethane composition of said non-foam region may be extruded and thermoformed. The non-foamed polyurethane composition of said non-foam region may injection molded.

The non-foam polyurethane of the non-foam region may have a weight average molecular weight of 120,000 to 500,000, and a polydispersity (Mw/Mn) of 1.85 to 2.51. In other embodiments, the non-foam polyurethane of the non-foam region may have a weight average molecular weight of 100,000 to 500,000 or even from 150,000 to 300,000, or even from 200,000 to 350,000 or even from 200,000 to 230,000. The non-foam polyurethane of the non-foam region has a polydispersity (Mw/Mn) of 2.30 to 2.50 or even from 2.30 to 2.33.

The non-foam polyurethane of the non-foam region may have: (i) a volume loss at room temperature, as measured by the DIN abrasion test, of less than 100 mm$^3$ or even less than 75, less than 60, less than 55, less than 50, or even from 40 to 100, or 40 to 60, or 40 to 50, or 40 to 45 or even 40 to 43 mm$^3$; a volume loss at 65° C., as measured by the DIN abrasion test, of less than 100 mm$^3$ or even less than 70 or less than 60, or even 30 to 60, or 30 to 55, or 40 to 55, or 47 to 55, or even 50 to 55 mm$^3$; (iii) a dry coefficient of friction, as measured by the Plint COF test, of at least 0.5, at least 0.6, at least 0.7, at least 0.8, or from 0.5 to 1.1, or from 0.7 to 1.1, or from 0.8 to 1.1, or from 0.8 to 0.9; and (iv) a wet coefficient of friction, as measured by the Plint COF test, of at least 0.5, or even from 0.5 to 0.9, or from 0.5 to 0.6, or from 0.55 to 0.9, or from 0.55 to 0.6.

In still further embodiments, the non-foam polyurethane of the non-foam region described herein have: a hard segment content of from 23.5 to 45.0 percent by weight, and the polyol component comprises a polyether polyol; a hard segment content of from 24 to 30 percent by weight, and the polyol component comprises a polyester polyol; or a hard segment content of greater than 30 percent by weight, and the polyol component comprises a polycaprolactone polyol.

In some embodiments, the polyurethane composition of the flexible foam region is prepared from: a chain extender that includes benzene glycol, 1,4-butanediol, or a combination thereof; a polyol that includes polytetramethylene ether glycol; and an isocyanate that includes 4,4'-methylene diphenyl diisocyanate. In other embodiments, the chain extender includes benzene glycol, 1,4-butanediol, or a combination thereof; the polyol includes butanediol adipate polyester polyol, an ethylene glycol adipate polyester polyol, a mixed ethylene glycol butanediol adipate ester or a combination thereof; and the isocyanate includes 4,4'-methylene diphenyl diisocyanate.

In further embodiments, the non-foam polyurethane of the non-foam region described herein have: a hard segment content of from 23.5 to 45.0 percent by weight or even from 23.9 to 43.3, or from 23.9 to 40.3, or even from 23.9 to 27.8; and the polyol component includes a polyether polyol which in some embodiments includes PTMEG.

The invention also provides a process of making the integrated articles described herein. The process includes the steps of: (I) forming a non-foam part from said polyurethane composition; (II) forming a flexible foam part from said polyurethane composition directly on said non-foam part; resulting in an integrated article. Any of the polyurethane compositions described herein may be used in these processes. In some embodiments, the same polyurethane composition is used to prepare the non-foam region and the flexible foam region.

In some embodiments, the non-foam region is made by injection molding. Then the injection molded non-foam region is placed inside a mold, where the injection foam molding takes place. The polyurethane composition used to make the flexible foam region is injection foam molded in to the mold that already contains the previously injection molded non-foam region. Once the foaming occurs inside the mold, the flexible foam region is integrated with the non-foam region via thermal bonding of the injected molten gas/polyurethane matrix to the non-foam outsole, resulting in an integrated article.

In some embodiments, the integrated article is made by co-injection. The polyurethane composition for the non-foam region is injected into the mold first and is molded into the non-foam region. Then the injection foam molding takes place in the same mold. Once the foaming occurs inside the mold, the flexible foam region is integrated with the non-foam region via thermal bonding of the injected molten gas/polyurethane matrix to the non-foam outsole, resulting in an integrated article.

In some embodiments the integrated article is made by manufacturing the flexible foam region and the non-foam region separately, by any means (including any extrusion technology). The two regions may then be integrated via additional thermoforming process. The non-foam region can be extruded and thermoformed.

In addition, the flexible foam region also can be extrusion foamed and thermoformed.

INDUSTRIAL APPLICATION

The integrated articles described herein may be used in any number of application and/or article. Examples include but are not limited to footwear applications where the flexible foam region of the article is a midsole and the non-foam region is an outsole. Other applications include personal protective equipment, sports protective equipment, heat insulation applications, acoustic/sound insulation applications, automotive interior applications, packaging applications, or any other number of applications where foam materials are currently used in combination with non-foam materials.

The amount of each chemical component described is presented exclusive of any solvent or diluent oil, which may be customarily present in the commercial material, that is, on an active chemical basis, unless otherwise indicated. However, unless otherwise indicated, each chemical or composition referred to herein should be interpreted as being a commercial grade material which may contain the isomers, by-products, derivatives, and other such materials which are normally understood to be present in the commercial grade. Unless otherwise noted, all molecular weight values are weight average molecular weight and may be measured by GPC.

It is known that some of the materials described above may interact in the final formulation, so that the components of the final formulation may be different from those that are initially added. For instance, metal ions (of, e.g., a flame retardant) can migrate to other acidic or anionic sites of other molecules. The products formed thereby, including the products formed upon employing the composition of the technology described herein in its intended use, may not be susceptible of easy description. Nevertheless, all such modifications and reaction products are included within the scope of the technology described herein; the technology described herein encompasses the composition prepared by admixing the components described above.

Examples

The technology described herein may be better understood with reference to the following non-limiting examples.

A series of polyurethanes are prepared and foamed to evaluate their foam processing properties and suitability to be the flexible foam region of the articles described herein. The polyurethanes are also formed into non-foam forms to evaluate their properties and suitability to be the non-foam region of the articles described herein.

The table below summarizes the formulations of the polyurethanes tested.

TABLE 1

| Example | Polyol | Isocyanate | Chain Ext | $M_w$ by GPC | $M_w/M_n$ by GPC | Hard Segment (%) |
|---|---|---|---|---|---|---|
| Inv A | Mixed Adipate Polyester | Aromatic Disocyanate | Aliphatic diol | 208598 | 2.33 | 28.4 |
| Inv B | Adipate Polyester | Aromatic Disocyanate | Aliphatic diol | 301415 | 2.48 | 26.4 |
| Comp C | Mixed Adipate Polyester | Aromatic Disocyanate | Aliphatic diol | 478218 | 2.46 | 24.8 |
| Comp D | Adipate Polyester | Aromatic Disocyanate | Aliphatic diol | 235718 | 2.29 | 23.4 |
| Comp E | Polyether | Aromatic Disocyanate | Aliphatic diol | 191225 | 2.34 | 48.1 |

Each of the polyurethanes described in Table 1 above is plasticized by the thermal energy, which is provided by a heated barrel and shear energy by screw rotation within the barrel. Once the polyurethane is fully plasticized within the barrel, a physical blowing agent, in a super critical fluid state, is directly injected into the barrel and solubilized into the plasticized polyurethane. The injected physical blowing agent and molten polyurethane are homogenized via rotation of a screw which has specially designed mixing sections. A set volume of the homogenized blowing agent and polyurethane mixture is then injected into a confined mold. During the injection stage, the blowing agent and polyurethane mixture starts its initial foaming process. When the injection is completed, the pressure of the mold is released and secondary foaming takes place, resulting in a flexible polyurethane injection molded foam.

As each polyurethane material is foamed it is rated on its foam processing properties. A summary of these ratings is presented in the table below where the ratings range from 0 to 10 with a 0 indicating untestable performance and a 10 indicating the best possible performance. The areas where the samples are rated included shot to shot consistency of the material, sample uniformity, surface quality of the resulting foam, the expansion capability of the material, and the foam structure focusing on uniformity of voids and the lack of large voids.

TABLE 2

| Example | Shot-to-shot consistency | Sample uniformity | Surface quality | Expansion capability | Foam structure |
|---|---|---|---|---|---|
| Inv A | 7 | 8 | 7 | 5 | 8 |
| Inv B | 8 | 5 | 7 | 5 | 5 |
| Comp C | 8 | 4 | 9 | 2 | 4 |
| Comp D | 6 | 2 | 3 | 5 | 3 |
| Comp E | 8 | 8 | 7 | 8 | 8 |

Each of the polyurethanes described in Table 1 and then foamed is then also tested to measure: (i) its vertical rebound, using ASTM D2632; (ii) its compression set at room temperature, using ASTM D395; (iii) its compression set at 50° C., using ASTM D395; and its Asker C hardness, using ASTM D2240. For the foam parts, a higher vertical rebound, lower compression set and higher Asker C hardness indicates better performance.

In addition, each of the polyurethanes described in Table 1 is also injection molded to form a non-foam part that is then tested to measure its DIN abrasion using ASTM D5963, measuring volume loss at room temperature and also at 65° C. in $mm^3$; and its wet and dry Plint coefficient of friction (COF) using an internally developed test based on ASTM F2333. Under this COF test a material sample to be tested is circular with the diameter of 1 and ⅜ inches (3.5 cm) and a thickness of about ⅛ of an inch (0.3 cm). The samples are tested at 9 Hz for 3 seconds each against a coated hardwood substrate. Each material is tested at least five times and an average is reported. Water is applied to the surface when measuring the wet COF. For the non-foam parts, a lower DIN abrasion at both conditions, and higher coefficient of friction at both conditions, indicates better performance.

TABLE 3

| Example | Vertical Rebound (%) | Compress Set at RT | Compress Set at 50 C. | Asker C Hardness | DIN Abrasion at RT | DIN Abrasion at 65 C. | Plint CoF Dry | Plint CoF Wet |
|---|---|---|---|---|---|---|---|---|
| Inv A | 40.50 | 5.46 | 31.13 | 49.57 | 42.42 | 54.84 | 0.71 | 0.57 |
| Inv B | 46.75 | 32.67 | 84.53 | 38.08 | 44.06 | 37.06 | 0.72 | 0.51 |
| Comp C | 31.50 | 8.81 | 81.36 | 38.14 | 43.40 | 59.78 | 0.86 | 0.49 |
| Comp D | 43.50 | 4.77 | 51.89 | 45.33 | 102.68 | 127.94 | 1.01 | 0.42 |
| Comp E | 32.08 | 8.36 | 45.60 | 61.86 | 45.85 | 46.67 | 1.08 | 0.25 |

The results show that Invention Examples A and B, and A in particular, have the best balance of properties overall, when evaluated as a foam and when evaluated as a non-foam. Thus Examples A and B provide the best combination of properties for making the integrated articles described above, that include both a flexible foam region and a non-foam region.

In addition, several integrated articles are prepared using the polyurethanes described in Table 1. For these examples a non-foam region is made by injection molding. Then the injection molded non-foam region is placed inside a mold, where the injection foam molding takes place. The polyurethane composition used to make the flexible foam region is injection foam molded into the mold already containing the previously injection molded non-foam region. Once the foaming occurs inside the mold, the flexible foam region is integrated with the non-foam region via thermal bonding of the injected molten gas/polyurethane matrix to the non-foam outsole, resulting in an integrated article. The details of these integrated articles are summarized in the table below.

TABLE 4

| Example | Foam TPU | Non-Foam TPU |
|---|---|---|
| Article A | Inv A | Inv A |
| Article B | Inv B | Inv B |
| Article C | Inv A | Inv B |
| Article D | Inv B | Inv A |

Each of the documents referred to above is incorporated herein by reference, including any prior applications, whether or not specifically listed above, from which priority is claimed. The mention of any document is not an admission that such document qualifies as prior art or constitutes the general knowledge of the skilled person in any jurisdiction. Except in the Examples, or where otherwise explicitly indicated, all numerical quantities in this description specifying amounts of materials, reaction conditions, molecular weights, number of carbon atoms, and the like, are to be understood as modified by the word "about." It is to be understood that the upper and lower amount, range, and ratio limits set forth herein may be independently combined. Similarly, the ranges and amounts for each element of the technology described herein can be used together with ranges or amounts for any of the other elements.

As used herein, the transitional term "comprising," which is synonymous with "including," "containing," or "characterized by," is inclusive or open-ended and does not exclude additional, un-recited elements or method steps. However, in each recitation of "comprising" herein, it is intended that the term also encompass, as alternative embodiments, the phrases "consisting essentially of" and "consisting of," where "consisting of" excludes any element or step not specified and "consisting essentially of" permits the inclusion of additional un-recited elements or steps that do not materially affect the basic and novel characteristics of the composition or method under consideration. That is "consisting essentially of" permits the inclusion of substances that do not materially affect the basic and novel characteristics of the composition under consideration.

While certain representative embodiments and details have been shown for the purpose of illustrating the subject technology described herein, it will be apparent to those skilled in this art that various changes and modifications can be made therein without departing from the scope of the subject invention. In this regard, the scope of the technology described herein is to be limited only by the following claims.

What is claimed is:

1. An article of footwear comprising:
   an integrated outsole and midsole, and an upper bonded to the integrated outsole and midsole;
   wherein said midsole comprises a flexible foamed polyurethane composition, wherein the foamed polyurethane composition of said flexible foam region has a weight average molecular weight of 120,000 to 500,000, and a polydispersity (Mw/Mn) of 1.85 to 2.51;
   wherein said outsole comprises a non-foamed polyurethane composition, wherein the non-foamed polyurethane composition has a weight average molecular weight of 200,000 to 350,000, and a polydispersity (Mw/Mn) of 2.30 to 2.50;
   wherein said foamed polyurethane composition and said non-foamed polyurethane composition comprise the reaction product of: (i) at least one polyol, (ii) at least one isocyanate, and (iii) at least one chain extender, wherein the combined isocyanate and chain extender make up a hard segment of the polyurethane compositions;
   wherein said foamed polyurethane composition is injection foam molded to form said midsole, and wherein said non-foamed polyurethane composition is injection molded to form said outsole; and
   wherein the chain extender comprises benzene glycol, 1,4-butanediol, or a combination thereof; wherein the polyol comprises a polyester polyol, a polyether polyol, a polycaprolactone polyol, or a combination thereof; and wherein the isocyanate comprises 4,4'-methylene diphenyl diisocyanate, m-xylene diisocyanate, phenylene-1,4-diisocyanate, naphthalene-1,5-diisocyanate, toluene diisocyanate, isophorone diisocyanate, 1,4-cyclohexyl diisocyanate, decane-1,10-diisocyanate, lysine diisocyanate, 1,4-butane diisocyanate, isophorone diisocyanate, 3,3'-dimethyl-4,4'-biphenylene diisocyanate, 1,5-naphthalene diisocyanate, dicyclohexylmethane-4,4'-diisocyanate or combinations thereof.

2. The article of footwear of claim 1 wherein the foamed polyurethane composition has:
   (i) a vertical rebound, as measured by ASTM D2632, of at least 35%;
   (ii) a compression set at room temperature, as measured by ASTM D395, of no more than 8%;
   (iii) a compression set at 50° C., as measured by ASTM D395, of no more than 45%; and
   (iv) an Asker C hardness, as measured by ASTM D2240, of 35 to 60.

3. The article of footwear of claim 1 wherein the non-foamed polyurethane composition has:
   (i) a volume loss at room temperature, as measured by the DIN abrasion test, of less than 100 mm$^3$;
   (ii) a volume loss at 65° C., as measured by the DIN abrasion test, of less than 100 mm$^3$;
   (iii) a dry coefficient of friction, as measured by the Plint COF test, of at least 0.5; and
   (iv) a wet coefficient of friction, as measured by the Plint COF test, of at least 0.5.

4. The article of footwear of claim 1, wherein the polyol comprises butanediol adipate polyester polyol, an ethylene glycol adipate polyester polyol, a mixed ethylene glycol butanediol adipate ester or a combination thereof.

5. The article of footwear of claim 1, wherein the foamed polyurethane composition has a hard segment content of from 23.5 to 45.0 percent by weight, and the polyol component comprises a polyether polyol.

6. The article of footwear of claim 1, wherein the foamed polyurethane composition has a hard segment content of from 24 to 30 percent by weight, and the polyol component comprises a polyester polyol.

7. The article of footwear of claim 1, wherein the foamed polyurethane composition has a hard segment content of greater than 30 percent by weight, and the polyol component comprises a polycaprolactone polyol.

8. The article of footwear of claim 1, wherein the non-foamed polyurethane composition has a hard segment content of from 23.5 to 45.0 percent by weight, and the polyol component comprises a polyether polyol.

9. The article of footwear of claim 1, wherein the non-foamed polyurethane composition has a hard segment content of from 24 to 30 percent by weight, and the polyol component comprises a polyester polyol.

10. The article of footwear of claim 1, wherein the non-foamed polyurethane composition has a hard segment content of greater than 30 percent by weight, and the polyol component comprises a polycaprolactone polyol.

* * * * *